(12) United States Patent
Tian et al.

(10) Patent No.: US 10,604,243 B2
(45) Date of Patent: Mar. 31, 2020

(54) AERIAL VEHICLE

(71) Applicant: Yuneec Technology Co., Limited, Kowloon, Hong Kong (CN)

(72) Inventors: Yu Tian, Jiangsu (CN); Wenyan Jiang, Jiangsu (CN)

(73) Assignee: Yuneec Technology Co., Limited, Hong Kong (CN)

( * ) Notice: Subject to any disclaimer, the term of this patent is extended or adjusted under 35 U.S.C. 154(b) by 173 days.

(21) Appl. No.: 15/578,452

(22) PCT Filed: Jul. 15, 2016

(86) PCT No.: PCT/CN2016/090193
§ 371 (c)(1),
(2) Date: Nov. 30, 2017

(87) PCT Pub. No.: WO2017/012515
PCT Pub. Date: Jan. 26, 2017

(65) Prior Publication Data
US 2018/0155016 A1 Jun. 7, 2018

(30) Foreign Application Priority Data

Jul. 17, 2015 (CN) .................... 2015 2 0523471 U
Dec. 22, 2015 (CN) .................... 2015 2 1081802 U

(51) Int. Cl.
*B64C 27/20* (2006.01)
*B64C 39/02* (2006.01)
(Continued)

(52) U.S. Cl.
CPC ............ *B64C 27/20* (2013.01); *B64C 11/001* (2013.01); *B64C 25/04* (2013.01); *B64C 25/32* (2013.01);
(Continued)

(58) Field of Classification Search
CPC ..... B64C 11/001; B64C 27/001; B64C 27/20; B64D 2033/022; B64D 2045/0095
See application file for complete search history.

(56) References Cited

U.S. PATENT DOCUMENTS 6,396,163 B1 * 5/2002 Sugiura ................. B66F 9/0755
307/10.1
8,328,130 B2 * 12/2012 Goossen ................. B64C 27/20
244/23 A
(Continued)

FOREIGN PATENT DOCUMENTS

CN 201632051 U 11/2010
CN 203090471 U 7/2013
(Continued)

OTHER PUBLICATIONS

PCT International Search Report for PCT/CN2016/090193, dated Oct. 8, 2016, 13 pages.
(Continued)

*Primary Examiner* — Christopher D Hutchens
(74) *Attorney, Agent, or Firm* — Law Offices of Liaoteng Wang

(57) ABSTRACT

Disclosed is an aerial vehicle, comprising: an airframe, a propeller(s), a duct(s) and a driving device, wherein the duct(s) is arranged on the airframe and adapted to increase a lifting force for the aerial vehicle, the propeller is arranged in the respective duct and is connected to the airframe, and the driving device is connected to the propeller(s) and is arranged on the airframe.

11 Claims, 9 Drawing Sheets

(51) Int. Cl.
   *B64C 29/00* (2006.01)
   *B64C 11/00* (2006.01)
   *B64C 27/08* (2006.01)
   *B64C 25/04* (2006.01)
   *B64C 25/32* (2006.01)
   *B64C 27/12* (2006.01)
   *B64D 47/08* (2006.01)

(52) U.S. Cl.
   CPC .............. *B64C 27/08* (2013.01); *B64C 27/12* (2013.01); *B64C 29/0025* (2013.01); *B64C 39/024* (2013.01); *B64D 47/08* (2013.01); *B64C 2025/325* (2013.01); *B64C 2201/027* (2013.01); *B64C 2201/108* (2013.01)

(56) References Cited

U.S. PATENT DOCUMENTS

| | | | | |
|---|---|---|---|---|
| 2010/0270427 | A1* | 10/2010 | Barrientos | B64D 33/02 244/1 R |
| 2012/0056041 | A1* | 3/2012 | Rhee | B64C 25/32 244/4 R |
| 2013/0233964 | A1* | 9/2013 | Woodworth | B64C 37/02 244/2 |
| 2014/0145026 | A1 | 5/2014 | Skjersaa | |
| 2014/0224014 | A1* | 8/2014 | Wang | F16F 15/00 73/504.04 |
| 2015/0232174 | A1* | 8/2015 | Jolly | B64C 27/001 74/574.2 |
| 2016/0200415 | A1* | 7/2016 | Cooper | A63H 27/12 244/17.15 |
| 2016/0221671 | A1* | 8/2016 | Fisher | B64C 27/08 |
| 2016/0229530 | A1* | 8/2016 | Welsh | B64C 39/024 |
| 2016/0340035 | A1* | 11/2016 | Duru | B64C 27/20 |
| 2017/0059319 | A1* | 3/2017 | Feng | G01C 21/265 |

FOREIGN PATENT DOCUMENTS

| | | |
|---|---|---|
| CN | 203264279 U | 11/2013 |
| CN | 203889065 U | 10/2014 |
| CN | 204170422 U | 2/2015 |
| CN | 204956910 U | 1/2016 |
| DE | 102011117605 A1 | 5/2013 |
| JP | 1991070699 A | 3/1991 |
| WO | 2006112578 A1 | 10/2006 |

OTHER PUBLICATIONS

The Second Official Action and search report dated Apr. 23, 2019 for Canadian Application No. 2988351, 3 pages.

* cited by examiner

AERIAL VEHICLE

CROSS REFERENCE

The present disclosure claims the benefits of a Chinese Patent Application No. 201520523471.0 filed on Jul. 17, 2015 and a Chinese Patent Application No. 201521081802.6 filed on Dec. 22, 2015. The above Chinese patent applications are incorporated entirely by reference in the disclosure.

TECHNICAL FIELD

The present disclosure relates to the technical field of flying machine, and especially relates to an aerial vehicle.

BACKGROUND

Generally, an existing aerial vehicle includes an airframe, a propeller, a motor and a battery. The battery is connected to the motor so as to provide power for the propeller. The propeller is arranged on the airframe, and the propeller can rotate when driven by the motor so as to provide the lifting force for the aerial vehicle. Generally, the larger the size of blades of the propeller is, the bigger the lifting three is, and the bigger the weight of the load-carrying aerial vehicle is. However, with the same payload, large blades will increase the weight of the aerial vehicle, and thus increase the overall weight of the aerial vehicle.

Furthermore, if the aerial vehicle is designed with a relatively long duration of flight, it shall carry a battery with a relatively large capacity. However, the larger capacity battery has a large weight, which further increases the overall weight of the aerial vehicle. Additionally, the bigger the weight of the aerial vehicle is, the more energy in the battery is consumed in per time unit. Therefore, even though the battery has a large capacity, the duration of flight of the aerial vehicle will be significantly reduced.

Based on the above analysis, the size of blades of the propeller has to be reduced such that the aerial vehicle may have a relatively high payload and a relatively long duration of flight. However, for prior art, the reduced size of blades will definitely reduce the load of the aerial vehicle, which are correlated with each other, so that the blades with a small size are able to drive the aerial vehicle to take off.

Therefore, an existing technical problem is how to ensure that the aerial vehicle maintains a relatively high load, a relatively long duration of flight and a relatively large lifting force when its propeller blade has a reduced size.

SUMMARY

An object of the present disclosure is to provide an aerial vehicle to solve an existing technical problem, i.e., how to ensure that the aerial vehicle maintains a relatively large lifting force and thus a relatively high load when its propeller blade has a reduced size.

There is provided an aerial vehicle, comprising: an airframe, a propeller(s), a duct(s) and a driving device, wherein the duct(s) is arranged on the airframe and adapted to increase a lifting force for the aerial vehicle, the propeller is arranged in the respective duct and is connected to the airframe, and the driving device is connected to the propeller(s) and is arranged on the airframe.

LIST OF REFERENCE SIGNS

Example 1

1—airframe; 2—propeller; 3—blade protection cover; 4—damping device; 5—analog camera; 6—PCB; 7—taking-off/landing supporting rod; 8—driving device; 9—body shield; 11—main frame; 12—duct housing; 13—retaining housing; 14—supporting lever; 15—protecting rod; 31—fixed block; 32—engaging groove; 41—damping support; 42—rubber ball; 81—battery; 82—motor; 121—duct; 122—engaging tap; 123—notch; 124—flange.

Example 2

1—upper shield; 2—propeller; 31—duct; 311—cylinder portion; 312—outward-extending portion; 32—motor mounting; 33—brace; 34—connecting post; 35—base; 36—pedestal; 4—damping washer; 5—main control board.

DETAILED DESCRIPTION

Below, the technical solution of the present disclosure will be described clearly and thoroughly in combination with accompanying drawings. Obviously, embodiments to be described are only a part, rather than all, of embodiments. All the other embodiments obtained by those skilled in the art without inventive efforts based on embodiments of the present disclosure fall into the scope of the present disclosure.

In the description of the present disclosure, it should be noted that directional or positional relations indicated with terms "center", "upper", "lower", "left", "right", "vertically", "horizontally", "in", "out" and the like are based on the directional or positional relation shown in the accompanying drawings, and set forth in order to provide a brief description of the present disclosure, rather than indicating or suggesting that devices or elements involved have the specific positions or are configured and operated in the specific positions. Therefore, the present disclosure is not limited to this. Furthermore, terms "first", "second" and "third" are only used in a descriptive sense, and not for the purposes of indicating or suggesting a relative importance.

In the description of the present disclosure, it should be noted that unless otherwise specified and defined explicitly, terms "installation", "connected with" and "connection" shall be understood in a broad sense, which may indicate for example fixed connections, detachable connections, integral connections, mechanical connections, electrical connections, direct connections, indirect connections by intermediate mediums, communications between interiors of two elements, etc. Those skilled in the art can understand particular meanings of the above terms in the present disclosure according to particular circumstances.

Example 1

Figure 1:
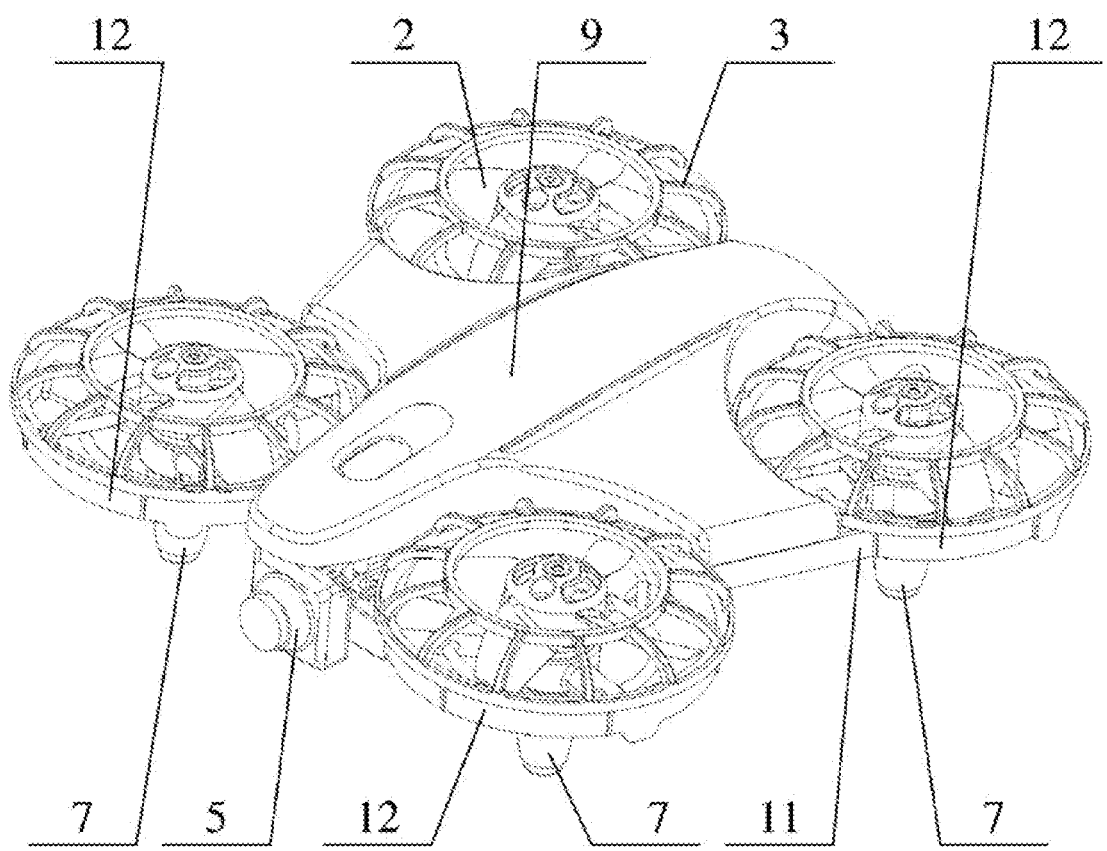
FIG. 1 is an isometric view of an aerial vehicle of Example 1.
Figure 2:
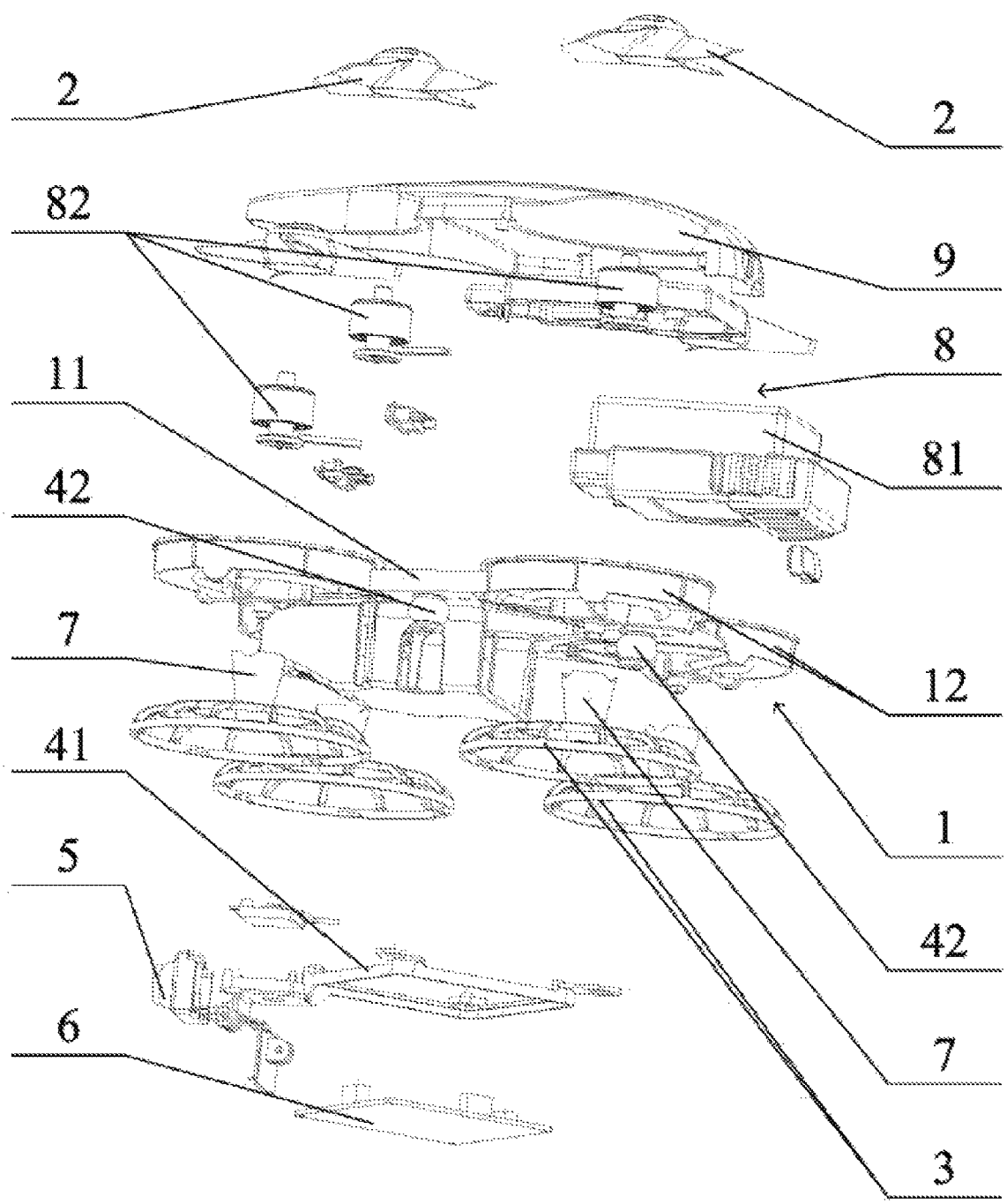
FIG. 2 is an explored view of the aerial vehicle shown in FIG. 1.
Figure 3:
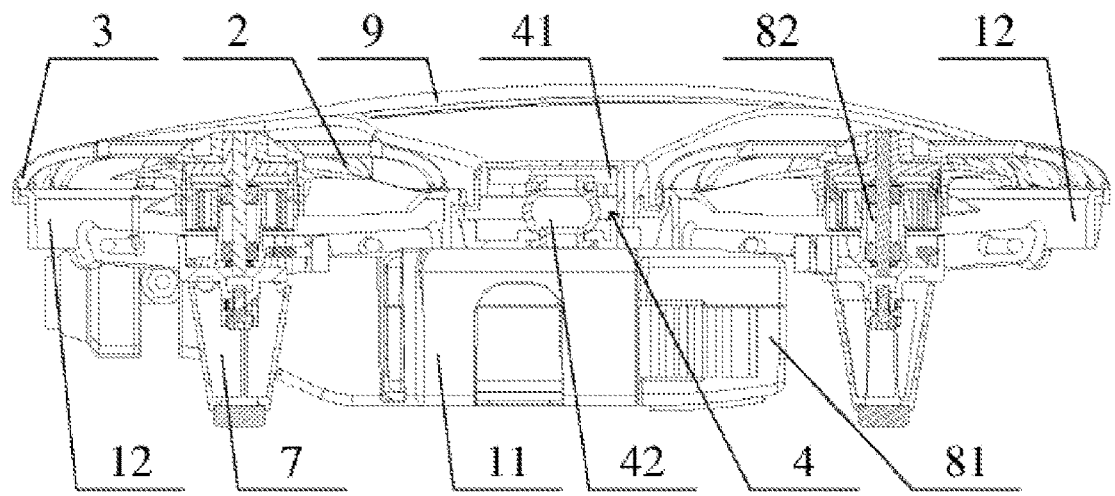
FIG. 3 is a sectional view of the aerial vehicle shown in FIG. 1.
Figure 4:
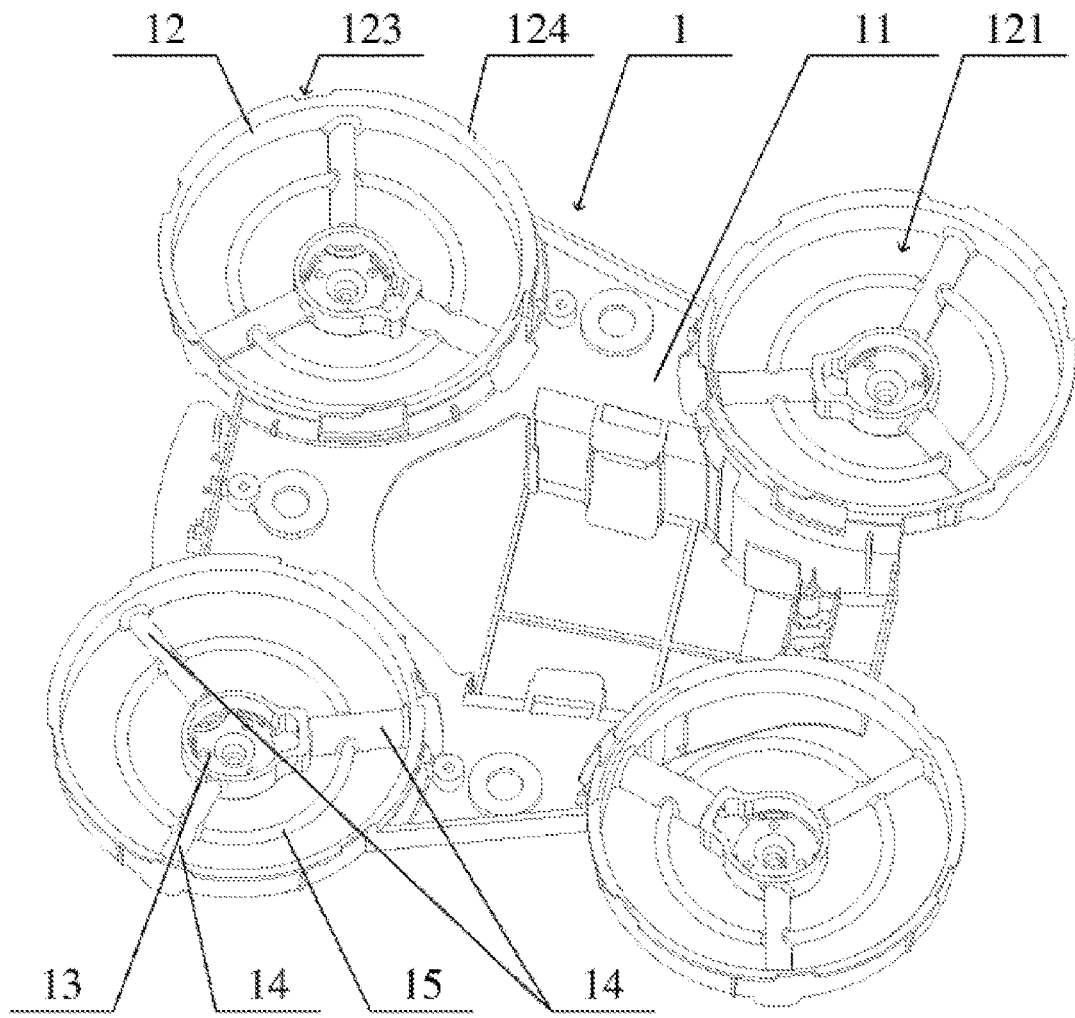
FIG. 4 is an isometric view of the airframe of the aerial vehicle shown in FIG. 1.
Figure 5:
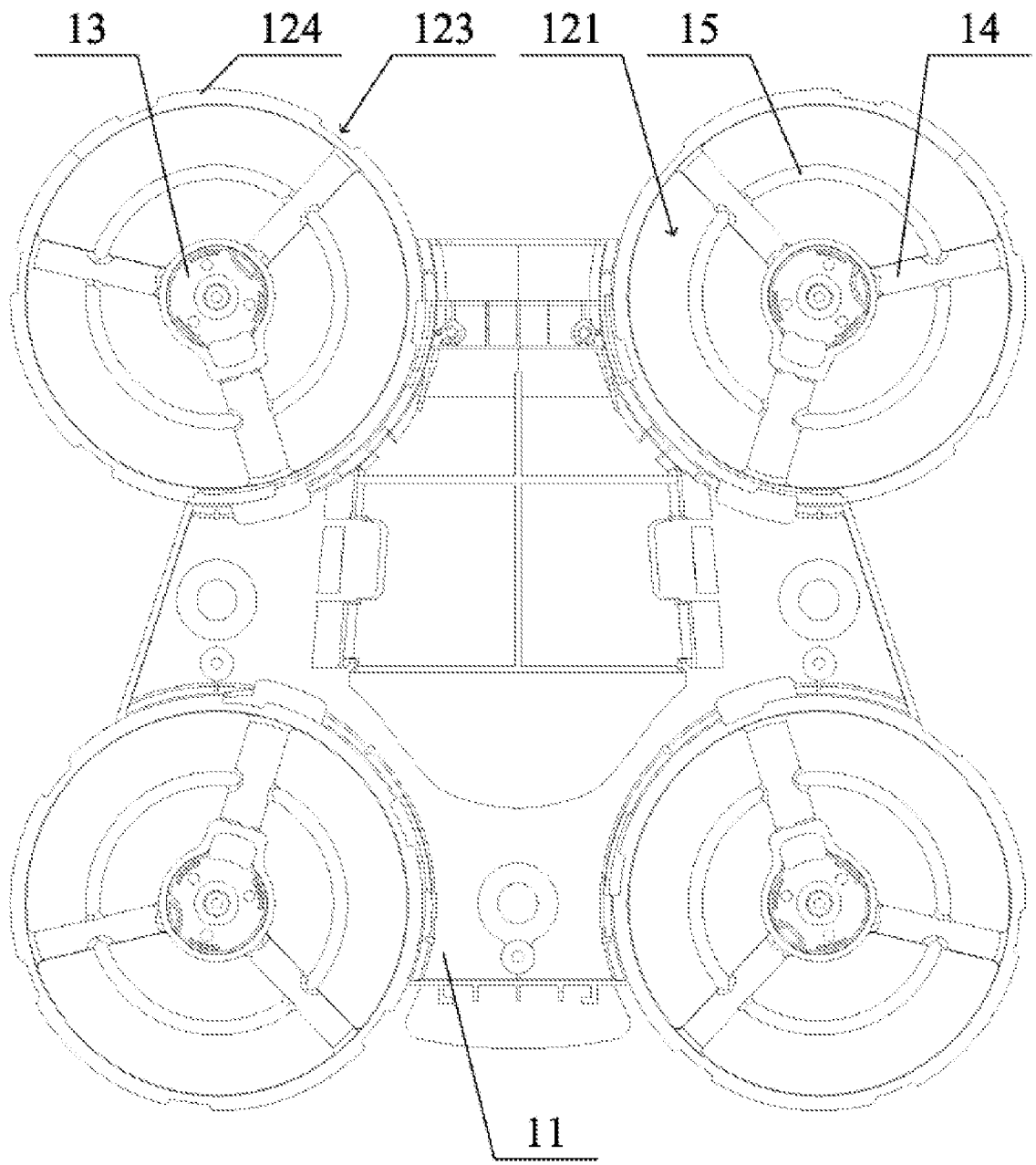
FIG. 5 is a top view of the airframe shown in FIG. 4.
Figure 6:
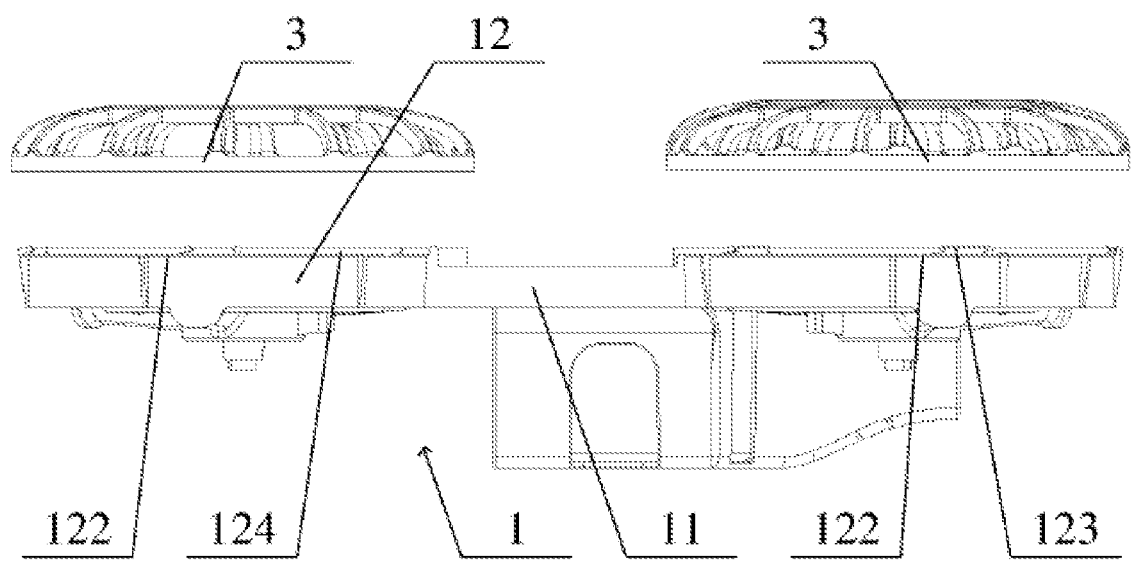
FIG. 6 is an explored view of the airframe and the blade protection cover of the aerial vehicle shown in FIG. 1.
Figure 7:
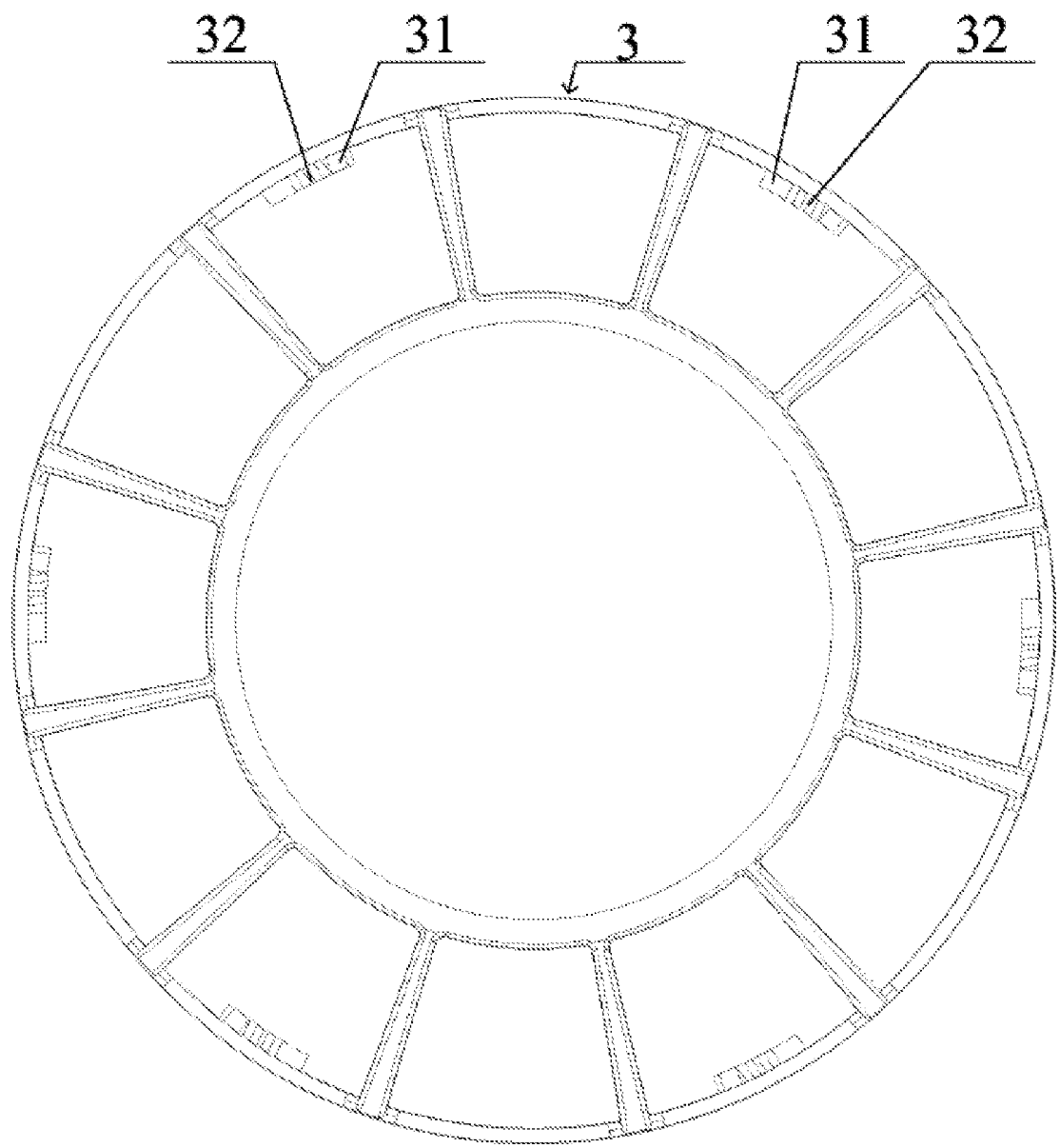
FIG. 7 is a top view of the blade protection cover of the aerial vehicle shown in FIG. 1.

FIG. 1 is an isometric view of an aerial vehicle of some embodiments of the present disclosure. FIG. 2 is an explored view of the aerial vehicle shown in FIG. 1. FIG. 3 is a sectional view of the aerial vehicle shown in FIG. 1. FIG. 4 is an isometric view of the airframe of the aerial vehicle shown in FIG. 1. FIG. 5 is a top view of the airframe shown in FIG. 4. FIG. 6 is an explored view of the airframe and the blade protection cover of the aerial vehicle shown in FIG. 1. FIG. 7 is a top view of the blade protection cover of the aerial vehicle shown in FIG. 1.

As shown in FIG. 1 to FIG. 7, there is provided an aerial vehicle including an airframe 1, a propeller(s) 2, a duct(s) 121 and a driving device 8. The duct 121 is arranged on the airframe 1 to increase a lifting force for the aerial vehicle. The propeller 2 is arranged in the respective duct 121 and connected to the airframe 1. The driving device 8 is connected to the propeller(s) 2 and arranged on the airframe 1.

It should be noted that the airframe 1 is a main framework of the aerial vehicle and provides an installation platform for individual elements of the aerial vehicle. Therefore, any component capable of achieving the above function can be implemented as the airframe 1 in the example. There are one or more the propellers 2, such as three, four, etc. The propeller 2 may be a two-blade propeller, a three-blade propeller, a four-blade propeller, etc. The duct 121 is mainly used to increase the lifting force for the aerial vehicle.

When the duct 121 is provided, the blades of the propeller 2 can have a smaller size such that a heavier aerial vehicle can be lifted by a smaller propeller(s) 2, while the overall weight and lifting force of the aerial vehicle are maintained unchanged. Furthermore, since the blades of the propeller 2 have a smaller size, the aerial vehicle can have a better flight stability.

The driving device 8 is mainly used to drive and rotate the propeller 2. There are various embodiments for the driving device 8. According to some embodiments, the driving device 8 includes a high-rotation-speed motor 82 and a chargeable battery 81 electrically connected with each other. The motor 82 includes an output shaft connected to the propeller 2. The battery 81 and the motor 82 are arranged on the airframe 1.

The high-rotation-speed motor 82 can rotate the propeller 2 at a faster speed and thus increase the lifting force for the aerial vehicle. Particularly, the high-rotation-speed motor 82 in the example can have a maximum rotation speed of up to 33,000±1,000 revolutions per minute during hovering or taking-off. Moreover, its rotation speed can increase by 3,400 revolutions per minute when its voltage increases by 1 volt. It should be noted that the rotation speed of the motor 82 may be decreased accordingly during straight and level flight of the aerial vehicle to reduce energy consumption. The chargeable battery 81 can provide energy to the aerial vehicle. The capacity of the battery 81 can be increased accordingly when the lifting force is sufficient to prolong the duration of flight of the aerial vehicle. It should be noted that one motor 82 is adapted to drive one propeller 2.

Particularly, for example, when the high-rotation-speed motor 82 is adopted and the aerial vehicle is provided with the duct(s) 121, the aerial vehicle can have a payload of up to about 180 g if it adopts a four-blade propeller(s) of 55 mm and the motor 82 has a diagonal size of 127 mm. However, for a general two-blade propeller of 60 mm, the payload is only 50 to 60 g.

It should be noted that if the aerial vehicle is designed without the duct 121, it is difficult for the aerial vehicle to maintain a relatively high payload, a relatively long duration of flight and a relatively large lifting force when the size of blades of the propeller 2 is reduced, even though the high-rotation-speed motor 82 is adopted. Contrarily, the motor 82 may be burned out when it rotates at a very high speed.

The aerial vehicle according to the embodiment includes the airframe 1, the propeller(s) 2, the duct(s) 121 and the driving device 8. The propeller 2, the duct 121 and the driving device 8 are arranged on the airframe 1. The driving device 8 can drive and rotate the propeller 2 to provide the lifting force for the aerial vehicle. The propeller 2 is arranged in the respective duct 121 such that the duct 121 will be in a complex airflow comprising a front incoming flow and a suction flow by the propeller 2. The duct 121 combines air entering its interior from various directions such that its incoming flow can pass through the duct 121 in a top-to-bottom direction. After passing through the duct 121, the air can apply a reverse thrust to the aerial vehicle in a bottom-to-top direction. Furthermore, the front incoming flow will form a large negative-pressure area in front of the entrance of the duct 121, thus an additional upward pulling force is generated. The wall of the duct 121 can improve the airflow characteristics around the blade's tip to reduce an induced resistance at the top and improve the lifting force resulted from blade rotation. A resultant force of the above reverse thrust and the pulling force can significantly increase the lifting force for the aerial vehicle. Therefore, with the duct 121, when the blades of the propeller 2 have a reduced size, the aerial vehicle can maintain a relatively high payload, a relatively long duration of flight and a relatively large lifting force.

Based on the above example, as shown particularly in FIG. 4 to FIG. 6, the airframe 1 can include a main frame 1, the duct 121 includes a cylindrical duct housing(s) 12 which is arranged on the periphery of the main frame 1, and an interior space is enclosed by the duct housing 12.

When the front incoming flow passes through the cylindrical duct 121, the reverse thrust applied on the aerial vehicle is more uniform. Furthermore, the side wall of the duct housing 12 can apply uniform forces to the top of blades in all direction, which further improves the stability of the aerial vehicle.

The duct housing 12 and the main frame 1 can be connected in various ways, such as integral connection, welding, splice joint, etc. According to some embodiments, the duct housing 12 and the main frame 1 are integrally connected such that it is ensured that they have a good connecting firmness.

It should be noted that there is only one propeller 2 arranged in each duct 12. That is to say, with a four-rotor layout, four duct housings 12 are required which are distributed uniformly at four corners of the main frame 1.

Based on the above example, as shown particularly in FIG. 6, the aerial vehicle can further include a blade protection cover(s) 3 arranged on the duct housing(s) 12.

The blade protection cover 3 and the duct housing 12 can be connected in various ways, such as welding, snap-fit, threaded connection, etc. According to some embodiments, the blade protection cover 3 and the duct housing 12 are detachably connected with each other such that the propeller 2 can be conveniently replaced and maintained.

During the operation of the aerial vehicle, an operator will be injured by the propeller 2 if he/she unintentionally touches the propeller 2, and it is more dangerous when the rotation speed of the propeller 2 is high. Therefore, the blade protection cover 3 is arranged to cover the propeller 2 to protect both the operator and the propeller.

Based on the above example, as shown particularly in FIG. 4 to FIG. 6, an outward extending flange 124 is arranged on an edge of the duct housing 12 and is provided with a plurality of engaging taps 122; and the blade protection cover 3 is provided with engaging grooves 32 which are adapted to engage with the engaging taps 122 to fix the blade protection cover 3 onto the duct housing 12.

It should be noted that the number of the engaging grooves 32 is equal to that of the engaging taps 122 and each engaging tap 122 corresponds to one engaging groove 32. The champing way makes the detachment between the duct housing 12 and the blade protection cover 3 more conveniently. Furthermore, the engaging grooves 32 may limit the position of the blade protection cover 3, i.e., avoiding the blade protection cover 3 from rotating in the circumferential direction of the duct housing 12 during the operating process of the aerial vehicle by the engaging grooves 32 being connected to the engaging taps 122.

Based on the above example, as shown in FIG. 7, the blade protection cover 3 is provided with a fixed block(s) 31 in which the engaging tap(s) 32 are arranged. A notch 123 is located in the flange 124 at an end of the engaging taps 122. The fixed block 31 is adapted to pass through the notch 123.

The fixed blocks 31 are provided on the blade protection cover 3 to increase the size of the engaging grooves 32, since the lower edge of the blade protection cover 3 generally has a small width. The engaging groove 32 is arranged in the fixed block 31. With the increasing size of the engaging grooves 32, the contacting area of the engaging grooves 32 and the engaging taps 122 can be increased, such that the engagement between them is more firm and the blade protection cover 3 can be firmly arranged on the duct housing 12.

Since the fixed block(s) 31 extends toward an interior of the blade protection cover 3, the blade protection cover 3 has a reduced inner diameter, and its minimum inner diameter is less than an outer diameter of the flange 124 of the duct housing 12. Therefore, the notch 123 is arranged on the flange 124 such that the blade protection cover 3 can successfully cover the duct housing 12. In installation, the fixed block(s) 31 is aligned with the notch(s) 123, and then the blade protection cover 3 is moved downward. After the blade protection cover 3 fully covers the duct housing, the blade protection cover 3 is turned to the left or right to engage the engaging groove(s) 32 with the engaging tap(s) 122 such that the blade protection cover 3 and the duct housing 12 are secured with each other.

Based on the above example, as shown particularly in FIG. 2 and FIG. 3, the aerial vehicle can further include a damping device 4 adapted to damp an impact resulted from a rotation of the propeller 2. The damping device 4 includes a damping support 41 and an elastic member, wherein the damping support 41 is connected to the main frame 1 through the elastic member, and a PCB 6 of the aerial vehicle is arranged on the damping support 41.

When operating at a high rotation speed, the propeller 2 will apply a large vibration force to the main frame 1, while the PCB (Printed Circuit Board) of the aerial vehicle is usually directly arranged on the main frame 1. The PCB 6 may be damaged if the main frame 1 vibrates seriously. Moreover, test results of a gyroscope on the PCB will be affected by the unstable main frame 1. Therefore, the damping device 4 is provided and the PCB 6 is arranged on the damping device 4 such that the impact applied to the PCB 6 from the main frame 1 can be damped.

Particularly, the PCB 6 is arranged on the damping support 41 which is connected to the main frame 1 through the elastic member. The elastic member is adapted to damp a vibrating force through its deformation when the vibrating force is applied to the main frame 1, such that the impact on the damping support 41 can be reduced and the PCB 6 can be further protected. Meanwhile, it is ensured that the gyroscope can operate under a relatively steady condition and thus its precision of test can be increased.

The elastic member may include be embodied in various ways, such as spring, corrugated tube, rubber element, etc.

Based on the above example, as shown particularly in FIG. 2 and FIG. 3, the elastic member may be a rubber ball 42.

The rubber ball 42 has a good elasticity and can damp the impacting force effectively. Furthermore, since the rubber ball 42 has a relatively large volume, it will not be deflected by external force which may weaken the buffering effect while it is compressed, even though there is no guiding member arranged around the rubber ball.

Based on the above example, as shown particularly in FIG. 1 and FIG. 2, the aerial vehicle can further include an analog camera 5 arranged on the damping support 41.

When the aerial vehicle according to the embodiment is applied in aerial photography, the analog camera 5 should be arranged on the aerial vehicle, usually on the main frame 1. The imaging of the analog camera 5 will be affected if the main frame 1 vibrates seriously. Therefore, the analog camera 5 is arranged on the damping support 41 to reduce the influence of the vibration of the main frame 1 on the analog camera 5.

Based on the above example, the aerial vehicle particularly further includes an undercarriage arranged on the airframe 1.

The aerial vehicle of the example takes off and lands vertically. Therefore, the undercarriage is arranged on the airframe 1 to reduce the impacting force of the ground to the aerial vehicle during landing process. Particularly, as shown in FIG. 3, the undercarriage is arranged on the main frame 1 and includes a plurality of taking-off/landing supporting rods 7. Each taking-off/landing supporting rod 7 is arranged under one propeller 2. The taking-off/landing supporting rods 7 and the main frame 1 can be connected in various ways, such as threaded connection.

Based on the above example, as shown in FIG. 4 and FIG. 5, the airframe 1 can further include a retaining housing 13, a protecting rod 15 and a plurality of supporting levers 14. One end of each of the supporting levers 14 is connected to a lower portion of the duct housing 12, and the other end is connected to the retaining housing 13. The protecting rod 15 successively passes through the supporting levers 14.

The motor 82 and the propeller 2 are arranged on the retaining housing 13, and the supporting levers 14 are connected to both of the duct 12 and the retaining housing 13. Therefore, the stableness of the overall structure can be enhanced. The protecting rod 15 is arranged to pass through the supporting levers 14, such that it is unlikely that the operator touches the propeller 2 and thus a better protect to the operator is provided.

It should be noted that, the aerial vehicle further includes a body shield 9 arranged over the main frame 1 to protect components in the interior of the aerial vehicle.

The body shield 9 is provided with a button which is connected to the driving device 8 to power on or off the aerial vehicle. Moreover, the button is connected to a lamp of the aerial vehicle such the lamp can be open or closed.

Example 2

As shown in FIG. 8 to FIG. 11, the aerial vehicle includes an upper shield 1, a propeller(s) 2, a duct(s) 31, a cylinder portion(s) 311, an outward-extending portion(s) 312, a motor mounting(s) 32, a brace(s) 33, a connecting post(s) 34, a base 35, a pedestal(s) 36, a damping washer(s) 4 and a main control board 5.

As shown in FIG. 5, the aerial vehicle of the present disclosure includes the propeller(s) 2 and the duct(s) 31, wherein each duct surrounds one propeller 2 from the outside. The duct 31 includes the cylinder portion 311 and the outward-extending portion 312 arranged above the cylinder portion 311, and an opening of the outward-extending portion 312 is larger than those of the cylinder portion 311.

Due to the constraint of the duct 31, it is less likely that the air laterally flows into a wind flow formed by the rotating propeller 2. Therefore, impact noises resulted from the lateral airflow and vacuum suction required by the wind flow when it absorbs the lateral airflow (i.e., induced resistance) can be reduced. Meanwhile, the efficiency is improved since the induced resistance and impacting noises are reduced. Furthermore, the outward-extending portion 312 has a larger opening and thus can induce more airflow into the cylinder portion 311 compared to a single cylinder, while the duct 31 can operate normally. Furthermore, the outward-extending portion 312 can provide a collision protect and thus a high safety to the aerial vehicle.

Figure 8:
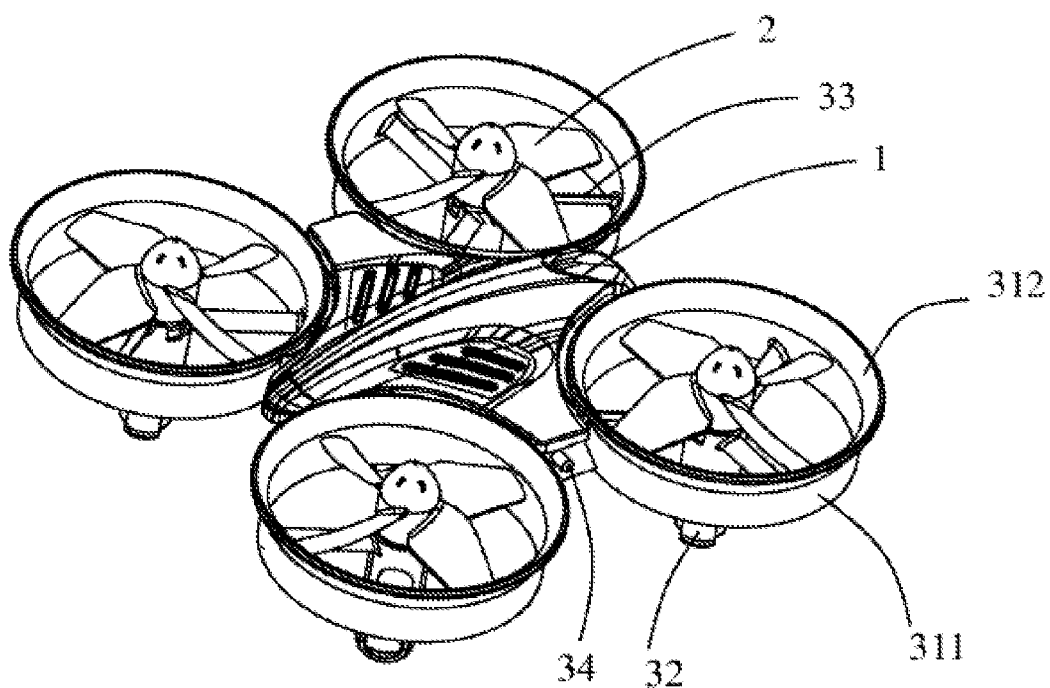
FIG. 8 is a structural schematic view of the aerial vehicle of Example 2.
Figure 10:
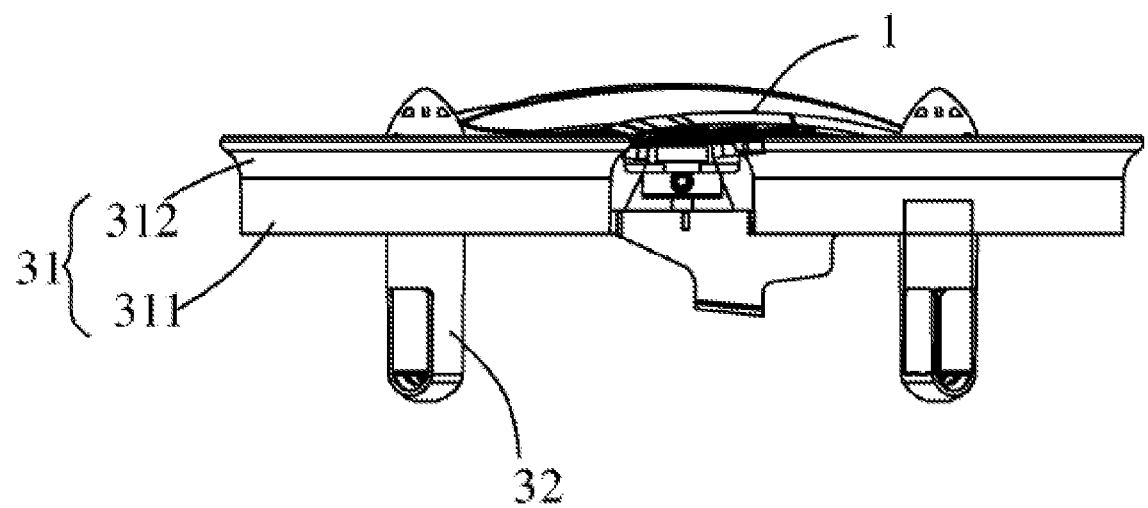
FIG. 10 is a structural side view of the aerial vehicle of Example 2.

As shown in FIG. 8 or FIG. 10, the outward-extending portion 312 of the example has a horn shape with a wider upper portion and a narrower lower portion. The outward-extending portion 312 can also be formed in other shapes so long as it can perform its functions.

Figure 11:
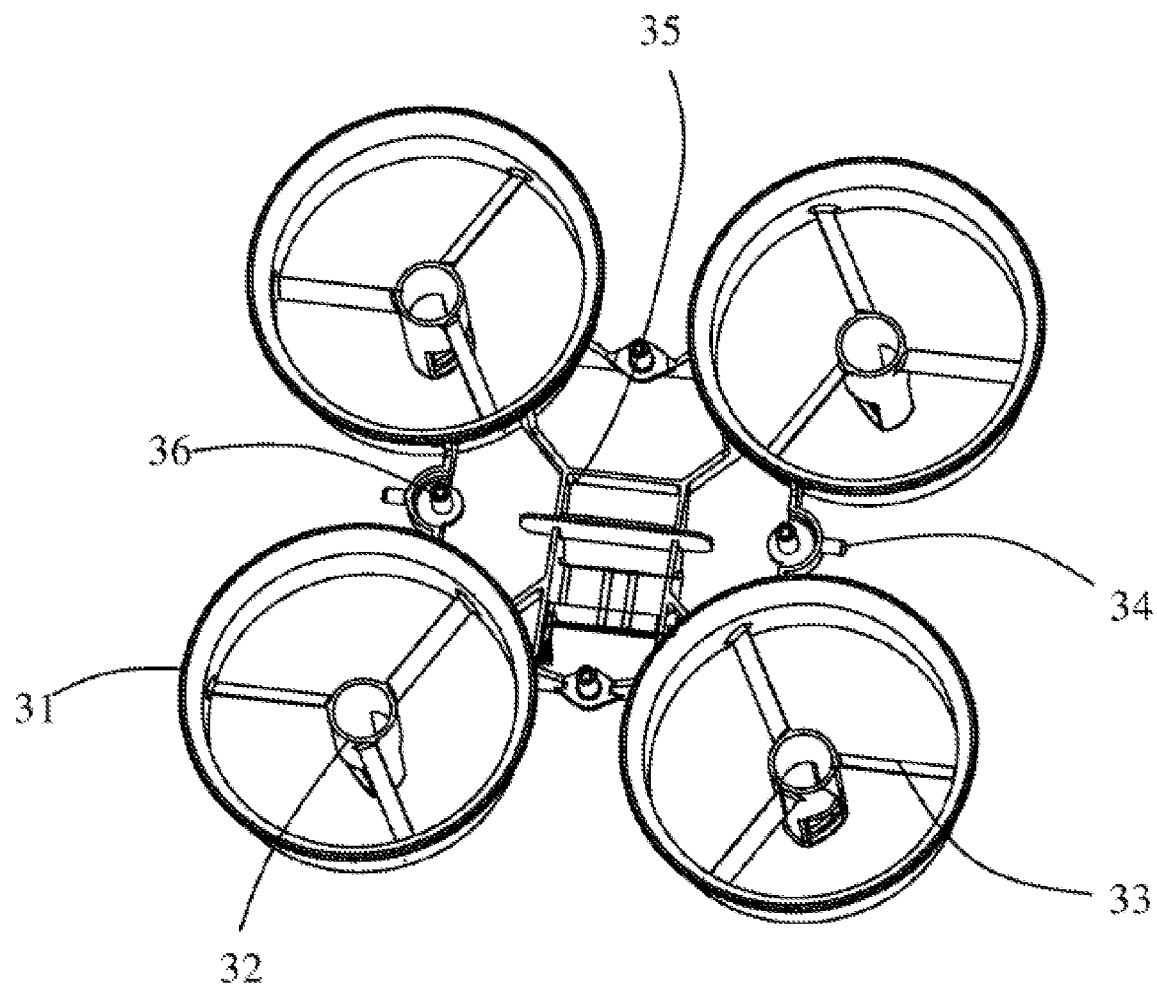
FIG. 11 is a structural schematic view of a base of Example 2.

As shown in FIG. 11, a motor mounting 32 is arranged in the duct 31 and connected to an inner wall of the duct 31 through a brace 33. The motor is arranged in the motor mounting 32 and is connected to the propeller 2.

As shown in FIG. 10, the motor mounting 32 extends beyond the duct 31 and serves as a taking-off/landing support. The motor mounting 32 can fix the motor and serve as the undercarriage at the same time, such that the aerial vehicle can have a more compact structure.

There are four ducts 31 and thus four propellers 2, which can be divided into two groups in diagonal directions. The propellers in different groups rotate in opposite directions to counteract the generated torque.

As shown in FIG. 11, the aerial vehicle of the example further includes a base 35 to which the duct(s) 31 is connected.

The duct 31, the brace 33, the motor mounting 32 and the base 35 are integrally formed. Due to the integral formation of the duct and its arrangement of surrounding the motor, the duct can prevent collision and serve as a support for the undercarriage, which makes the structure more compact.

Figure 9:
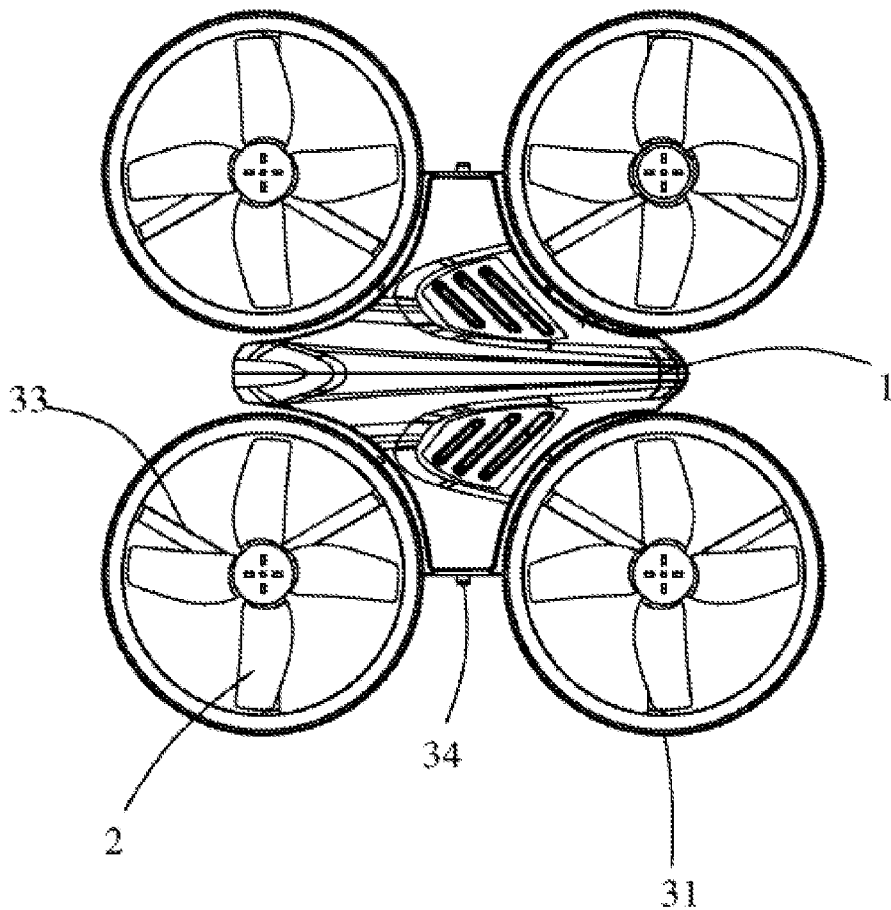
FIG. 9 is a structural top view of the aerial vehicle of Example 2.

As shown in FIG. 8 and FIG. 9, an upper shield 1 is arranged above the base 35. Connecting posts 34 for fixing the upper shield are arranged at two ends of the base 35 and are adapted to pass through the upper shield 1. Therefore, both ends of the upper shield 1 are engaged with the connecting posts 34, thus the upper shield 1 is fixed.

Figure 12:
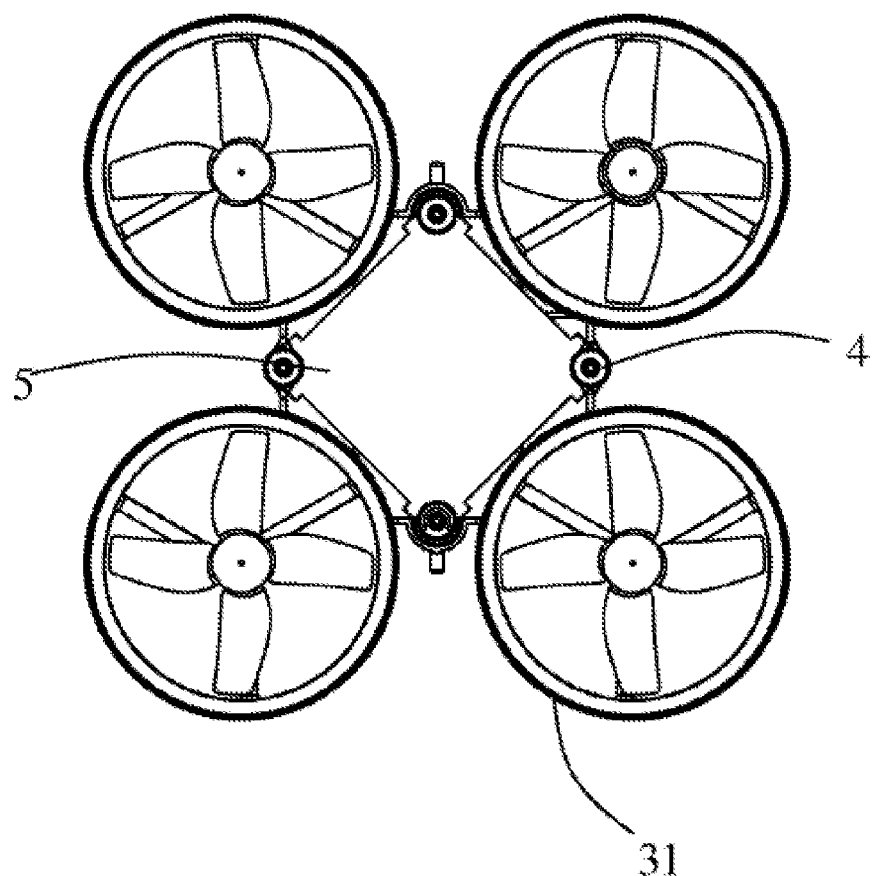
FIG. 12 is a schematic view in which a main control board of Example 2 is mounted.
Figure 13:
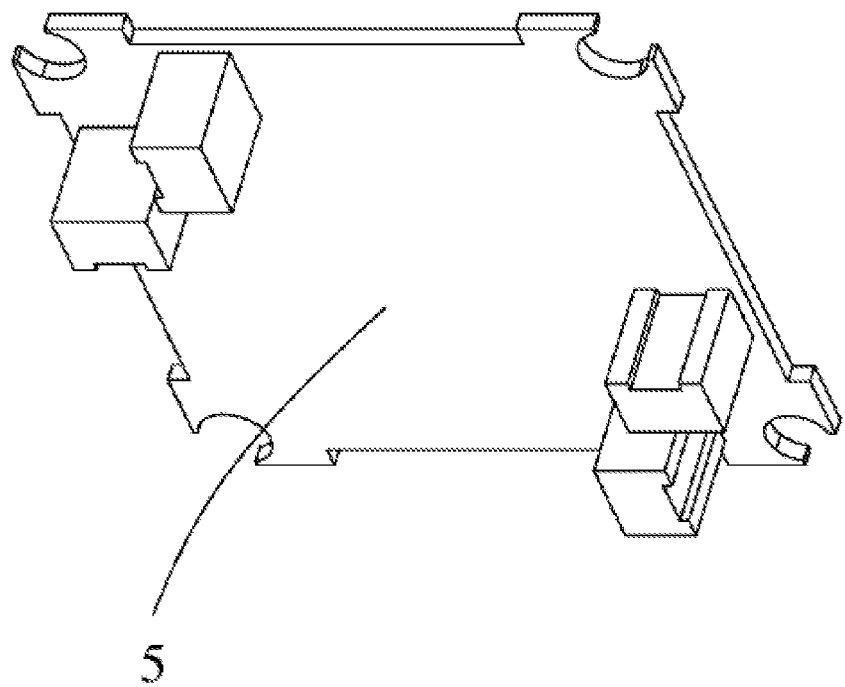
FIG. 13 is a structural schematic view of the main control board of Example 2.

A pedestal(s) 36 is arranged on the base 35. As shown in FIG. 12 and FIG. 13, four corners of the main control board 5 are installed and fixed at the pedestals 36. A damping washer 4 is arranged on the pedestal 36 and adapted to support the upper shield 4 to reduce vibrations.

Although several embodiments of the invention have been disclosed in the foregoing specification, it is understood by those skilled in the art that these embodiments shall be considered as exemplary only, and various modifications and changes can be made without departing from the scope thereof. It is intended that the scope of the invention only be limited by the appended claims.

What is claimed is:

1. An aerial vehicle comprising,
an airframe, a propeller(s), a duct(s) and a driving device, wherein the duct(s) is arranged on the airframe and adapted to increase a lifting force for the aerial vehicle, the propeller is arranged in the respective duct and is connected to the airframe, and the driving device is connected to the propeller(s) and is arranged on the airframe,
wherein the airframe comprises a main frame, the duct comprises a cylindrical duct housing which is arranged on the periphery of the main frame, and an interior space is enclosed by the duct housing,
wherein the aerial vehicle further comprises a damping device adapted to damp an impact resulted from a rotation of the propeller(s), and
the damping device comprises a damping support and an elastic member, wherein the damping support is connected to the main frame through the elastic member, and a PCB of the aerial vehicle is arranged on the damping support,
wherein the elastic member is a rubber ball,
the duct comprises a cylinder portion and an outward-extending portion, and an opening of the outward-extending portion is larger than that of the cylinder portion,
a motor mounting is arranged in the duct and is connected to an inner wall of the duct through a brace, and the motor is arranged in the motor mounting and is connected to the propeller,
the aerial vehicle further comprises a base to which the duct(s) is connected,
wherein an upper shield is arranged above the base,
wherein a pedestal(s) is arranged on the base and a main control board is fixed on the pedestal(s), and a damping washer is arranged on the pedestal for supporting the upper shield.

2. The aerial vehicle of claim 1, wherein the aerial vehicle further comprises a blade protection cover(s) arranged on the respective duct housing.

3. The aerial vehicle of claim 2, wherein an outward extending flange is arranged on an edge of the duct housing and is provided with a plurality of engaging taps; and
the blade protection cover is provided with engaging grooves which are adapted to engage with the engaging taps to fix the blade protection cover onto the duct housing.

4. The aerial vehicle of claim 1, wherein the aerial vehicle further comprises an analog camera arranged on the damping support.

5. The aerial vehicle of claim 1, wherein the aerial vehicle further comprises an undercarriage arranged on the airframe.

6. The aerial vehicle of claim 1, wherein the driving device comprises a motor and a chargeable battery electrically connected with each other, wherein an output shaft of the motor is connected to the propeller, and the battery and the motor are arranged on the airframe.

7. The aerial vehicle of claim 1, wherein the outward-extending portion has a horn shape.

8. The aerial vehicle of claim 1, wherein the motor mounting extends beyond the duct and serves as a taking-off/landing support.

9. The aerial vehicle of claim 1, wherein there are four ducts.

10. The aerial vehicle of claim 1, wherein the duct, the brace, the motor mounting and the base are integrally formed.

11. The aerial vehicle of claim 1, wherein connecting posts for fixing the upper shield are arranged at two ends of the base and are adapted to pass through the upper shield.

* * * * *